UNITED STATES PATENT OFFICE.

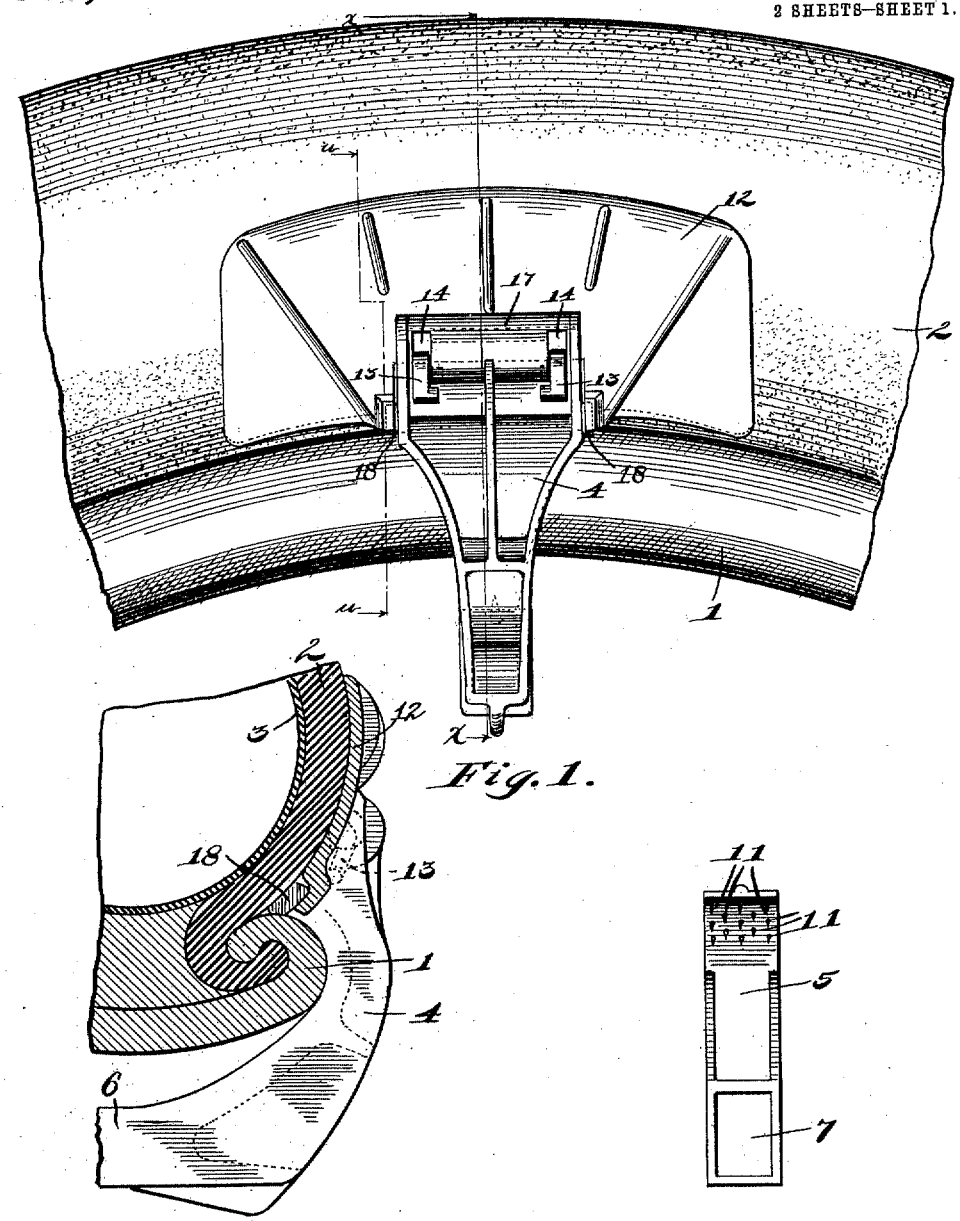

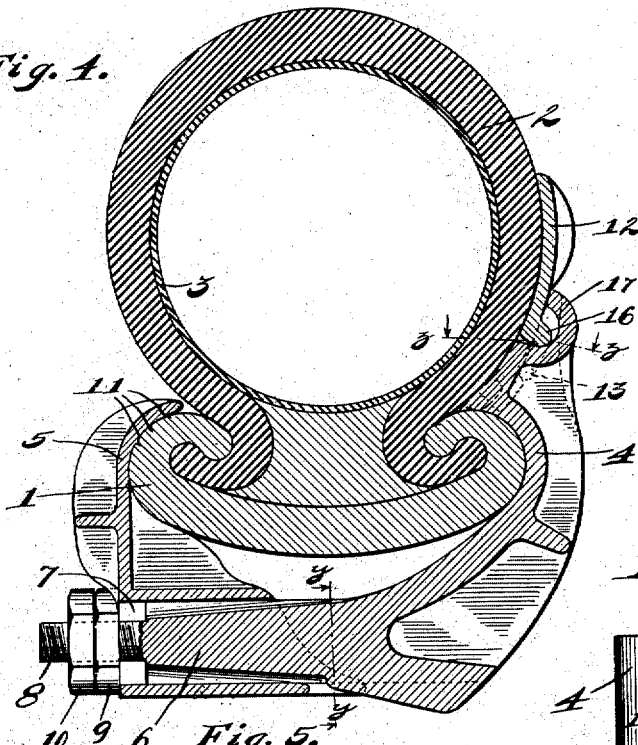
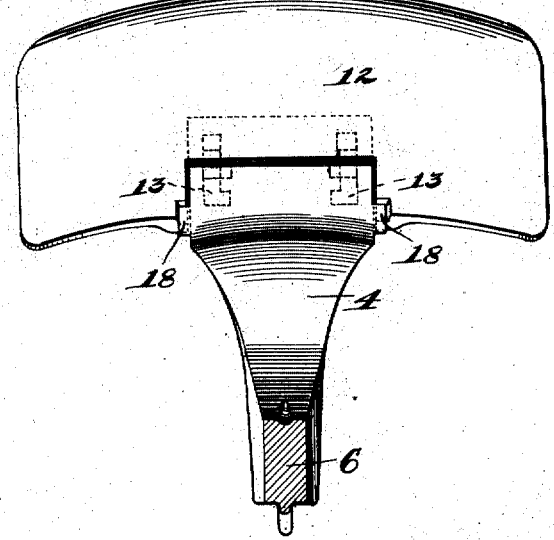

GUSTAVE J. MARTEL, OF CHICAGO, ILLINOIS.

TIRE-PATCH.

985,532.  Specification of Letters Patent.  Patented Feb. 28, 1911.

Application filed October 10, 1910. Serial No. 586,242.

*To all whom it may concern:*

Be it known that I, GUSTAVE J. MARTEL, a citizen of the United States, and a resident of the city of Chicago, county of Cook, and State of Illinois, have invented certain new and useful Improvements in Tire-Patches, of which the following is a specification.

My invention relates to patching devices for tires and more specifically to that class thereof designed for use in the patching of blow-outs or of reinforcing the tire at a blow-out.

The object of my invention is the provision of a tire patch of the character mentioned which may be readily and expeditiously applied for use or detached when not desired, which will be adapted when applied to cover the rent or blow-out in the tire and to reinforce the tire in the vicinity of the rupture.

A further object is the provision of a tire patch as characterized which will be of durable and economical construction and efficient in operation.

Other objects will appear hereinafter.

With these objects in view my invention consists in a tire patch characterized as above mentioned and in certain details of construction and arrangements of parts all as will be hereinafter more fully described and particularly pointed out in the appended claims.

My invention will be more readily understood by reference to the accompanying drawings forming a part of this specification, and in which, Figure 1 is a fragmentary side elevation of a conventional form of pneumatic tire and rim to which is applied a patching device embodying the preferred form of my invention, Fig. 2 is an enlarged detail section taken on substantially line *w*—*w* of Fig. 1, Fig. 3 is an end elevation of one of the clamping jaws included in the construction, the inner side of the jaw being shown, Fig. 4 is a transverse section taken on substantially line *x*—*x* of Fig. 1, Fig. 5 is a section taken on line *y*—*y* of Fig. 4, the tire and rim being omitted, and Fig. 6 is a detail section taken on line *z*—*z* of Fig. 4.

Referring now to the drawings 1 indicates an ordinary pneumatic wheel rim in which is secured in the ordinary manner the pneumatic tire casing 2, 3 indicating the air tube arranged in the latter. Detachably secured upon the rim 1 is my improved tire patching device comprising the jaw members 4 and 5, the upper or outer ends of said jaw members being of a conformation adapting the same to snugly embrace the opposite edges of said rim. Formed at the inner end of the jaw member 4 is a transversely extending shank 6 which loosely or slidably engages a socket 7 provided in the inner end of the jaw member 5 for the snug reception thereof. The outer end portion 8 of the shank 6 is reduced and screw threaded for the reception of a nut 9 which is threaded thereon, the latter being adapted to abut the outer end of the jaw member 5 in order to effect the forcing or drawing of the jaw members 4 and 5 into clamping engagement with the opposite edges of the rim as indicated. With this arrangement it will be seen that in the arrangement of the device upon a wheel rim it is only required after arranging the edges upon the latter to apply the nut 9 and to rotate the same until said jaw members are forced to the position indicated in Fig. 4. In order to prevent retrograde rotation of the nut 9 and hence loosening of the jaws a locking nut 10 is provided which abuts the outer end of the nut 9. The inner side or contacting surface of the jaw member 5 is provided with gripping teeth 11 which are adapted, when the device is applied to a rim to engage the adjacent surface of the latter and thereby prevent slipping of the device upon the rim. Said jaw members 4 and 5 are, as will be observed, of ribbed construction since this construction, as is known, is very light and at the same time of great strength and durability.

Mounted in the upper extended end of the jaw member 4 is the patch plate 12 the inner surface thereof being of a conformation identical with that of the adjacent side of the tire casing 2 so that said patch plate is adapted to recess in snug engagement with said tire casing when arranged thereon. The lower edge of said plate is cut away centrally for the reception of the upper end of said jaw member 4, the same being provided with spaced depending fingers 13 which loosely engage slots 14 provided in the upper end portion of said jaw member. The lower ends of said fingers 13 are enlarged so that insertion thereof into the slots 14 is only permitted at the lower enlarged ends 15 of said slots. With this arrangement it will be seen that after once inserting said fingers into said slots the same will be locked therein and hence the plate 12 locked to the jaw member 4 release of said fingers and hence detachment of said plate being permitted only when the enlarged lower ends of said fingers are in registration with said enlarged ends 15 of the slots 14. The lower edge of said plate 12 at the recess therein is provided with an outwardly projecting bead 16 the upper end portion 17 of said jaw being semi-cylindrically formed or channeled for the reception thereof. Said bead is so arranged that, when the plate is in operative position in the jaw member 4 and against the side of the tire, said plate will be supported upon the outer end of said bead. This provision is made so that the point or edge of support of said plate shall be outward of the center of gripping of said plate and so that, upon collapse of the tire, the outer end of said plate will swing inwardly by its own gravity. With this arrangement, upon collapse of the tire as by reason of a blow-out, when the vehicle is running the plate 12 will swing inwardly upon such collapse preventing engagement of the outer edge thereof with the ground, as the wheel is rotated and hence avoiding jarring of the car such as would result were said plate held rigid. Outward swinging of the plate 12 is remedied by locks 18 formed at the edges of the jaw member 4, such locks being arranged for engagement by the adjacent lower edge of said plate as clearly shown in Figs. 2 and 5.

A device of the construction as set forth is durable and economical, the same may be readily and quickly applied to or detached from a rim, and when applied the same is adapted to positively and thoroughly support the portion of the tire engaged by the plate 12.

While I have shown what I deem to be the preferable form of my patching device I do not wish to be limited thereto as there might be various changes made in the details of construction and the arrangements of parts described without departing from the spirit of the invention as comprehended within the scope of the appended claims.

Having described my invention what I deem as new and desire to secure by Letters Patent is:

1. The combination with a rim and a pneumatic tire mounted thereon, of a patch for said tire, said patch comprising two operatively connected gripping jaw members detachably engaging opposite sides of said rim; and a plate pivotally connected to one of said jaw members and held thereby against the adjacent side of said tire, substantially as described.

2. The combination with a rim and a pneumatic tire mounted thereon, of a patching device for said tire, said device comprising two jaw members embracing said rim; and an elongated patch plate having spaced fingers pivotally engaging slots in one of said jaw members, said plate being held in engagement with the adjacent side of said tire by the outer end of said jaw member, the same being so supported that when the tire is collapsed the outer end of said plate will be free to swing toward said tire, substantially as described.

3. The combination with a rim and a pneumatic tire mounted thereon, of a patching device for said tire, said device comprising two jaw members embracing said rim; and an elongated patch plate having spaced fingers pivotally engaging slots in one of said jaw members, said plate being held in engagement with the adjacent side of said tire by the outer end of said jaw member, the same being so supported that when the tire is collapsed the outer end of said plate will be free to swing toward said tire, there being lugs provided on the sides of the corresponding jaw member engaging the inner edge of said plate to prevent inward swinging of said inner edges, substantially as described.

In testimony whereof I have signed my name to this specification in the presence of two subscribing witnesses.

GUSTAVE J. MARTEL.

Witnesses:
 FLORENCE E. LILLIS,
 JOSHUA R. H. POTTS.